March 24, 1970  R. L. GRECO ET AL  3,502,325
CARD HANDLING APPARATUS

Filed April 21, 1967  7 Sheets-Sheet 1

INVENTORS
ROBERT L. GRECO
JACK O. WILSON
BY
ATTORNEYS

INVENTORS
ROBERT L. GRECO
JACK O. WILSON
ATTORNEYS

March 24, 1970   R. L. GRECO ET AL   3,502,325
CARD HANDLING APPARATUS

Filed April 21, 1967   7 Sheets-Sheet 3

INVENTORS
ROBERT L. GRECO
JACK O. WILSON
BY
ATTORNEYS

INVENTORS
ROBERT L. GRECO
JACK O. WILSON
BY
ATTORNEYS

INVENTORS
ROBERT L. GRECO
JACK O. WILSON
BY
ATTORNEYS

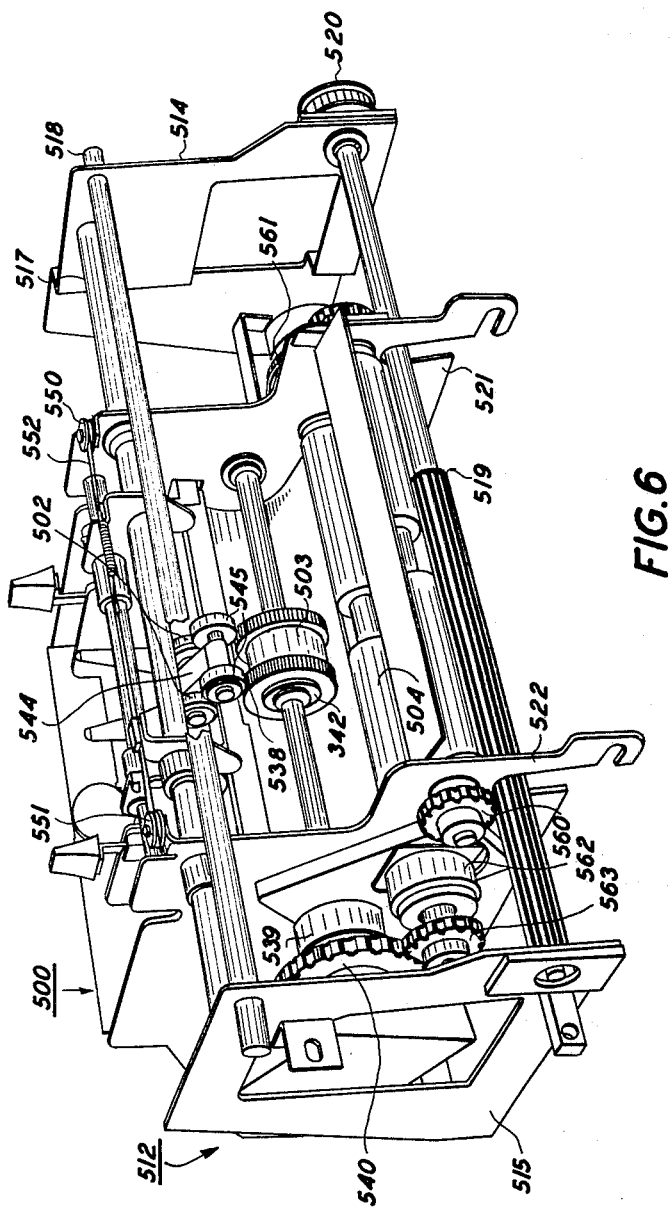

United States Patent Office 3,502,325
Patented Mar. 24, 1970

3,502,325
CARD HANDLING APPARATUS
Robert L. Greco, Penfield, and Jack O. Wilson, Rochester,
N.Y., assignors to Xerox Corporation, Rochester, N.Y.,
a corporation of New York
Filed Apr. 21, 1967, Ser. No. 632,642
Int. Cl. B65h *3/06*
U.S. Cl. 271—36         6 Claims

ABSTRACT OF THE DISCLOSURE

Feeding apparatus for feeding card stock retained in a shingled relationship under constant pressure against feeding wheels including gating means for timing the feeding of the card stock and alignment means for laterally positioning the feeding apparatus and maintaining the card stock centered about the feeding wheels.

BACKGROUND OF THE INVENTION

This invention relates to document feeding devices and relates particularly to a device for feeding cards in precise alignment and at precise instances in time.

Document feeding devices commonly serve machines which perform an operation on a document such as reading or recording information on the document. The feeding devices normally deliver documents to the machine they serve in a fixed orientation and at a constant rate. Some feeding devices feed documents at a random rate established by the machine with which they are functioning but the timing of the delivery of the individual documents is normally not critical to the operation performed on the document. These feeding devices are not suited for use with a machine that requires a document to be received at a precise instant in time and in a particular orientation in order to perform an operation on the document.

The present feeding device was designed to feed card stock, for example electrical accounting machine (EAM) cards, to a xerographic reproducing machine which produces semi-micro images of an original document on the EAM cards. The xerographic machine requires the feeding device to be an active participant in the operation performed on a card. The reproducing machine utilizes the xerographic process disclosed in U.S. Patent No. 3,062,109, issued to C. R. Mayo et al. wherein an electrostatic or latent image of an original document is formed on a moving photoreceptive surface, developed, for example, by the application of a powder referred to as toner and then transferred to a suitable support material. It is in this process of transferring the developed image from the photoreceptive surface to an EAM card that the present feeding device plays an active role.

The transfer of a xerographic toner powder image to a card requires accurate registration of the card to the image and precise timing in the delivery of a card into contact with the moving photoreceptive surface. The image is centered about a constant optical line on the photoreceptive surface but it may have varying lateral dimensions. Hence, the feeding device must be able to vary the registration of a card to accommodate the image formed on the moving photoreceptive surface. The instant in time at which a card is fed to the reproducing machine is dependent on the time at which the latent image is formed and the speed at which the photoreceptive surface is moving. The time at which the image is formed and the speed at which the image moves must be considered in order that the card and image arrive at the transfer station at the same instant in time.

Prior art feeding devices are designed to deliver cards in fixed registration and at a rate that is independent of the operation to be performed on the card. Their feeding mechanisms are not particularly adapted to cope with timing the delivery of a document to an event occurring within the machine it serves. Prior art feeders are designed to operate with machines which synchronize their operations to the rate at which documents are supplied. The present feeding device, on the other hand, synchronizes the feeding of cards to a sequence of events internal to the machine which it serves.

The instant feeding device overcomes the limitations of prior art feeding devices in providing means for feeding card stock in timed relation to events internal to the machine it serves. The feeding devices utilize an improved friction wheel, nudger wheel, and card passing throat combination to serially eject cards from a stack. Increased efficiency and reliability in the feeding of cards is obtained by maintaining the cards under constant pressure against the friction and nudger wheels regardless of the number of cards in a stack. Novel and simplified adjustment means are used to accommodate cards of varying thickness and outside dimensions. An improved driving mechanism is employed to obtain spacing between cards and to facilitate a random card feeding rate. The entire feeding device is laterally adjustable, relative to the machine which it serves, to provide a varying registration in delivery of the cards. The feeding device is designed so that as a stack of cards is laterally positioned relative to a machine, the cards remain centered about the card-ejecting friction wheel. These features and others which will be set forth are provided in order to permit the document feeding device to cooperate with its associated machine in performing an operation on a document and also to improve the performance of card feeders in general.

Accordingly, it is an object of the present invention to improve document feeding apparatus.

It is another object of the present invention to improve document feeding devices to allow lateral adjustments for delivering cards in varying registration.

It is another object of the present invention to improve the operation of document feeding devices so that they may be compatible with a machine that requires cards to be fed at a random rate in response to an instantaneous command.

It is another object of the present invention to improve the operation of document feeding devices to allow the delivery of cards in timed relation to external events.

It is another object of the present invention to improve the card retaining mechanisms in a feeding device to facilitate the feeding of cards.

It is another object of the present invention to improve in card feeders of the type wherein a card is ejected from a stack through a throat formed between a feed wheel and a stationary edge, the adjustment means for varying the dimension of the throat.

It is another object of the present invention to improve card feeding devices by incorporating means for varying the lateral registration of cards retained in the feeding device without varying the relationship of the cards to the feeder.

SUMARY OF THE INVENTION

The present invention is an improved document feeding device which incorporates improved means for delivering cards at precise instances in time and at varying lateral registration to the machine which it serves. The feeding device comprises an improved card retaining mechanism and improved means for ejecting cards from a stack. The present invention also includes improved means for adjusting the feeder so as to be capable of handling cards of different thicknesses. The feeding device utilizes a novel and simplified drive means to permit a random operation of the ejecting means and to insure spacing between serially ejected cards. Novel gating means are employed for controlling the delivery of cards to an external device.

BRIEF DESCRIPTION OF THE DRAWINGS

For a better understanding of the invention as well as other objects and further features thereof, reference is had to the following detailed description of the invention to be read in connection with the accompanying drawings.

FIGURE 6 is a perspective view of the feeding device as removed from the xerographic machine.

DESCRIPTION OF THE PREFERRED EMBODIMENT

Figure 1:
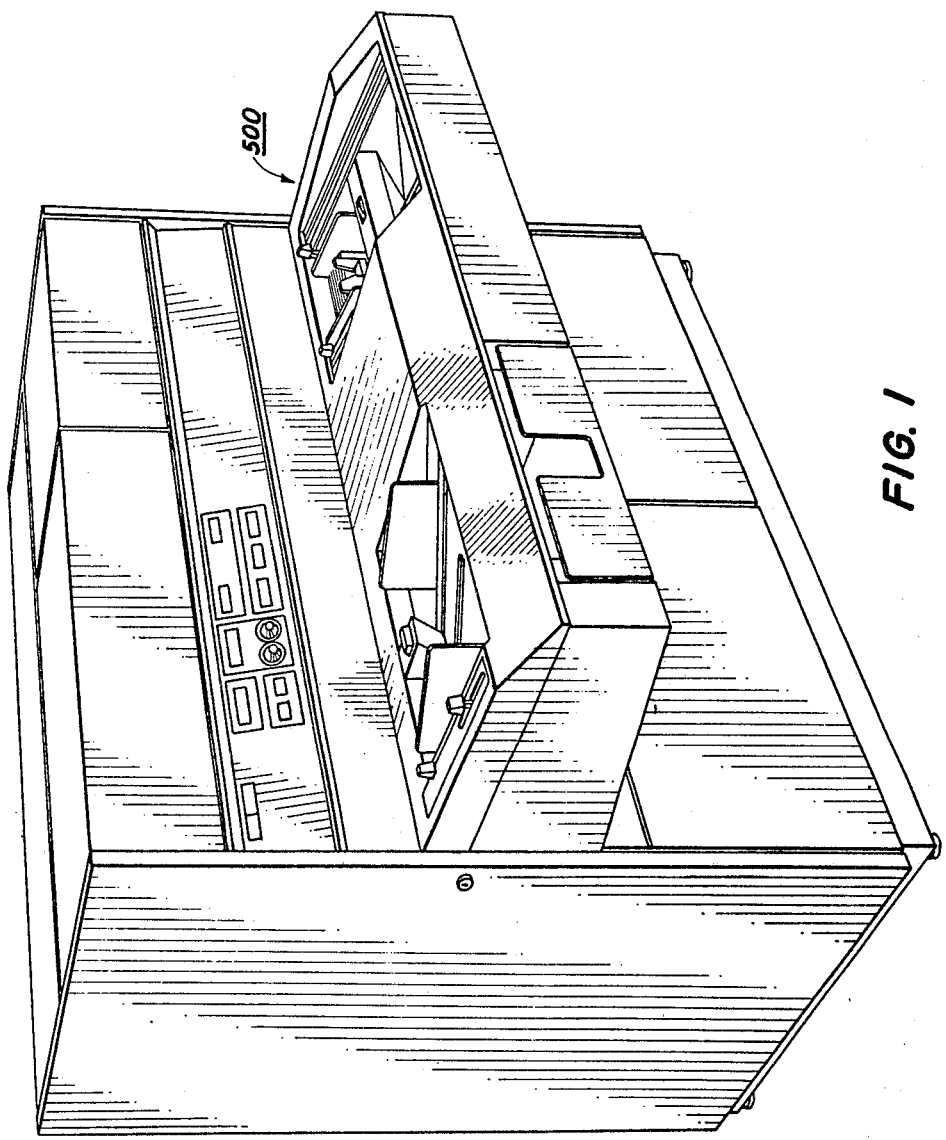
FIGURE 1 is a perspective view of the instant feeding device incorporated with a xerographic reproducing machine.
Figure 2:
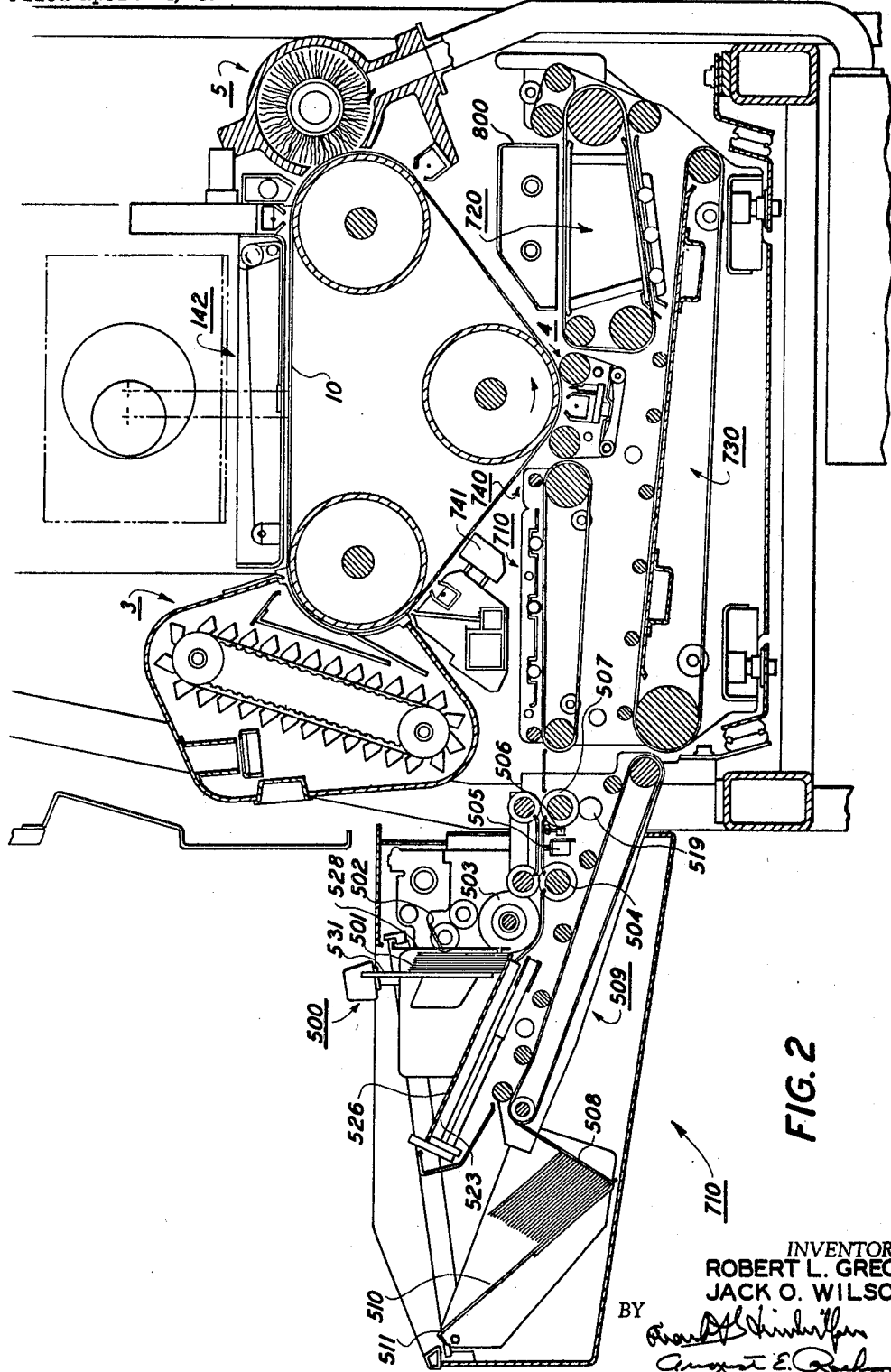
FIGURE 2 is a sectional view of the instant feeding device and xerographic machine.

The instant feeding device 500 is shown in FIGURE 1 incorporated in a xerographic reproducing machine. The feeding device 500 delivers card stock, e.g., EAM cards, data processing cards, indexing cards, etc., sequentially to the reproducing section of the machine where a copy of an original document is reproduced on the cards. The operation of the card feeder in conjunction with the xerographic machine is best understood by referring to the sectional view of the xerographic machine shown in FIGURE 2. The card feeder 500 plays an active roll in assisting the xerographic machine in transferring an image of an original document formed on photoreceptive belt 10 to a card.

To assist in the understanding of the present invention the operation of the feeding apparatus is first briefly discussed in connection with the xerographic reproducing machine. This discussion is followed by a detailed description of the structure of the card feeder and a discussion of its functional operation.

An electrostatic image or latent image of an original document is formed on a photoreceptive belt 10 at an imaging station by instantaneously exposing the belt to an entire document. The photoreceptive belt 10 is driven at a constant speed by a power source (not shown) coupled to the belt support unit 142 and advances the latent image to the development station 3 where toner particles are cascaded over the image. Development of the image is effected with developer material which comprises, in general, a material of a suitable pigmented or dyed electroscopic powder, hereinafter to be referred to as toner, and a granular carrier material, which latter functions to carry and to generate triboelectric charges on the toner in the development of an image, the toner powder is brought into surface contact with the photoreceptive belt and is held thereon electrostatically in a pattern corresponding to the electrostatic latent image. The continuous moving belt 10 thereafter approaches transfer station 4 where the developed image is transferred to a card. The transfer of the toner particles to the card is accomplished by charging the reverse side of the card to an electrical potential opposite in polarity to the charge on the toner powder particles. The electrical charge required to effect the transfer is applied, for example, by a corotron of the type disclosed in Vyverberg Patent 2,836,725. Following the transfer of the developed image the continuous moving photoreceptive belt 10 proceeds to the cleaning station 5 where the belt is reconditioned to permit the formation of subsequent images. Reconditioning the photoreceptive belt is accomplished by charging the surface to loosen excess toner particles which are then removed by a rotating brush. The photoreceptive belt is thereafter flooded with light to neutralize the charge on its surface.

The present feeding device feeds a card to the xerographic machine at a time that will permit the card to arrive at the transfer station 4 at the same instant as the developed image. Initially, a card is ejected from stack 501 by the action of nudger wheels 502 and friction wheel 503 and advanced to the primary feed rollers 504 and stop switch 505. Stop switch 505 generates an electrical signal upon the arrival of the card causing feed rollers 504, friction wheels 503 and nudger wheels 502 to stop. The card is held at the stop switch 505 until an electrical signal is issued by the xerographic machine indicating that a document has been imaged onto the belt 10. The signal issued by the xerographic machine energizes the feed rollers 504 to drive the card forward past inhibit switch 506 to the secondary feed rollers 507. The inhibit switch 506 initiates the transmission of an electrical signal to the xerographic machine while the card is in contact with switch 506. This electrical signal prevents the formation of additional images on the photoreceptive belt thereby establishing the minimum spacing between images formed on the belt and assisting the stop switch in establishing the minimum distance between cards.

The secondary feed rollers 507 advance the card to conveyor belt 710 internal to the xerographic machine. The speed of conveyor 710 is such to enable a card placed on the belt 710 to arrive at the transfer station 4 at the same time as the developed image. Although cards are ejected in proper registration by the card feeder, it may be desirable to insert a registration gate, at point 740, for example, to temporarily restrain the motion of the card on the conveyor 710, to realign an edge of the card to the photoreceptive belt 10. When a registration gate is used, means for detecting the location of the developed image on the belt 10 must be employed for issuing a command to release the registration gate at the proper instant in time to insure that the card and developed image arrive at transfer station 4 simultaneously. The location of the image on the belt 10 is determined by a photocell that scans the belt for a timing mark placed on the belt when the latent image is originally formed. A photocell, positioned at point 741 for example, detects the timing mark associated with the image and issues a signal to the registration gate to release the card. The command sent to the registration gate is timed to allow the image and the card to arrive simultaneously at the transfer station 4.

Following the transfer of the developed image to a card, the card is advanced by conveyor 720 to fuser 800 where the developed image is permanently affixed to the card. Thereafter, the card is returned to the stacker tray 508 by the xerographic machine conveyors 720 and 730 and the feeder conveyor belt 509. The conveyor 720 reverses the direction of the card and places it onto conveyor 730. Conveyor 730 delivers the card to the feeder conveyor belt 509 which in turn transports the card to the stacking tray 508. The stacker tray 508 consists of a tray 510 hinged at point 511 to permit the tray to pivot about point 511 under the weight of the cards.

Figure 3:
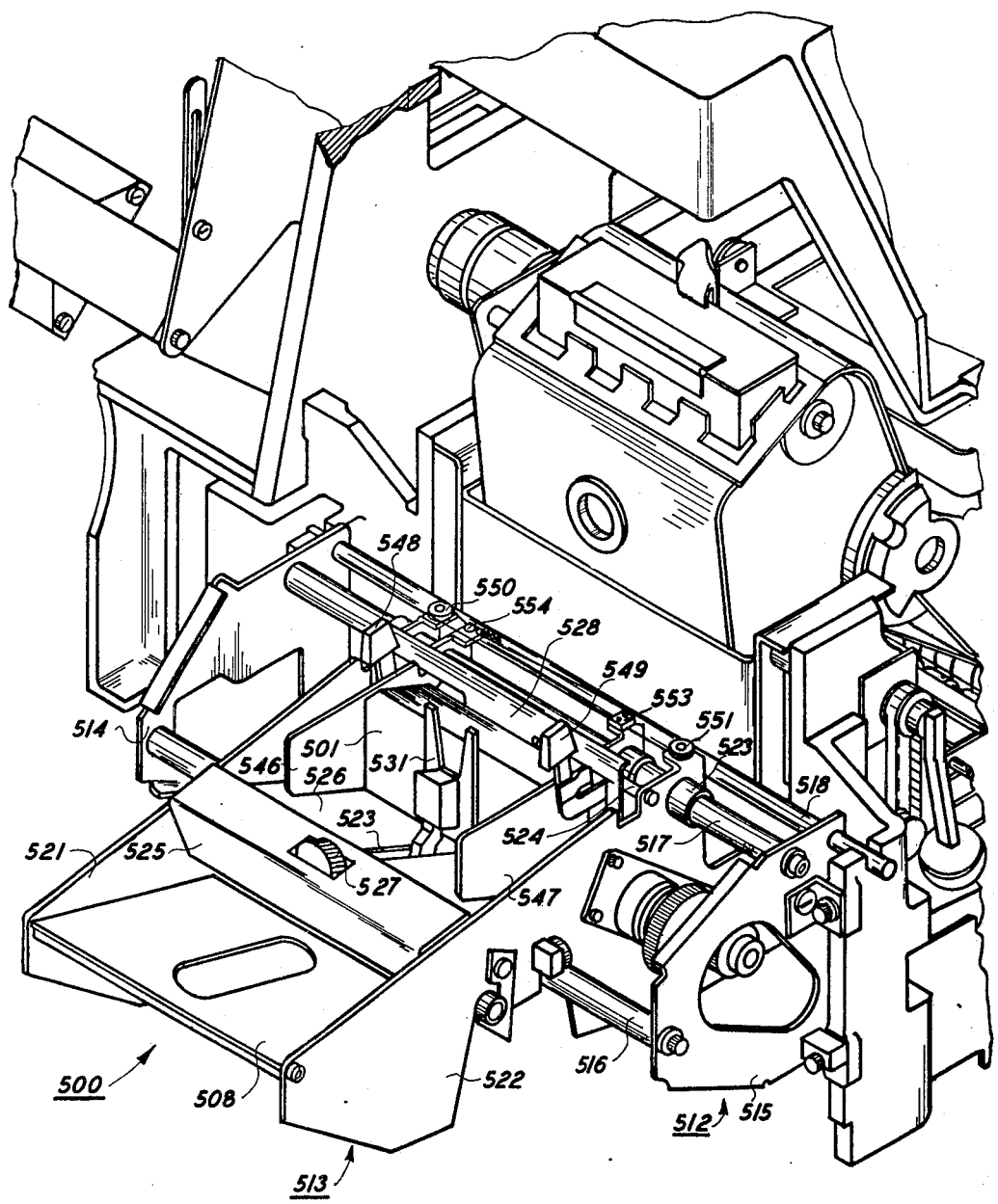
FIGURE 3 is a perspective view of the present feeding device as coupled to the xerographic machine.

The present card feeder 500 is comprised of two basic units, the frame 512 and the carriage 513 as shown in FIGURE 3. The frame 512 is mounted on the xerographic machine in a position to enable cards to be fed at varying lateral positions to the conveyor belt 710. Frame 512 includes end panels 514 and 515 remotely spaced from each other by three parallel guide rods 516, 517, and 518. As best seen in FIGURE 6, spline shaft 519 is rotatably supported by the end panels 514 and 515 in a position substantially parallel to the guide rods 516, 517 and 518, and has sprocket 520 keyed thereto at its end adjacent to end panel 514. Sprocket 520 is adapted to receive continuous rotary motion from a power source in the xerographic machine (not shown). Because sprocket 520 is keyed to the spline shaft 519, the spline shaft is continuously rotated, providing a continuous driving means for the mechanism which operates the feeder. The feeder mechanism will be described more fully below.

Again referring to FIGURE 3, carriage 513 is slidably supported by guide rods 516, 517, and 518, which are a part of frame 512. Side plates 521 and 522 are slidably mounted on the frame guide rods 516, 517, and 518. Inclined base plate 523, together with guide rod 524 and channel member 525 are mounted between the side plates and maintain them at a fixed distance from each other. Bed plate 526 is slidably mounted on top of base plate 523 and provides the surface on which cards are supported. A differential screw (not shown) is operatively connected to both the slidable bed plate and the base plate for adjusting the position of the bed plate relative to the base plate. Dial 527 records on a scale the position of the bed plate relative to the base plate. Fixed abutment plate 528 is mounted between side plates 521 and 522 and is the surface against which the leading card in a stack abuts prior to the time it is fed into the xerographic machine.

Bed plate 526 and base plate 523 have a longitudinal slot 529 centrally positioned between side plates 521 and 522 through which standard 530 extends. Rigidly attached to standard 530 is adjustable abutment plate 531 which is substantially parallel to the fixed abutment plate 528. The adjustable and fixed plates are the members between which the cards are retained while waiting to be fed.

Figure 5:
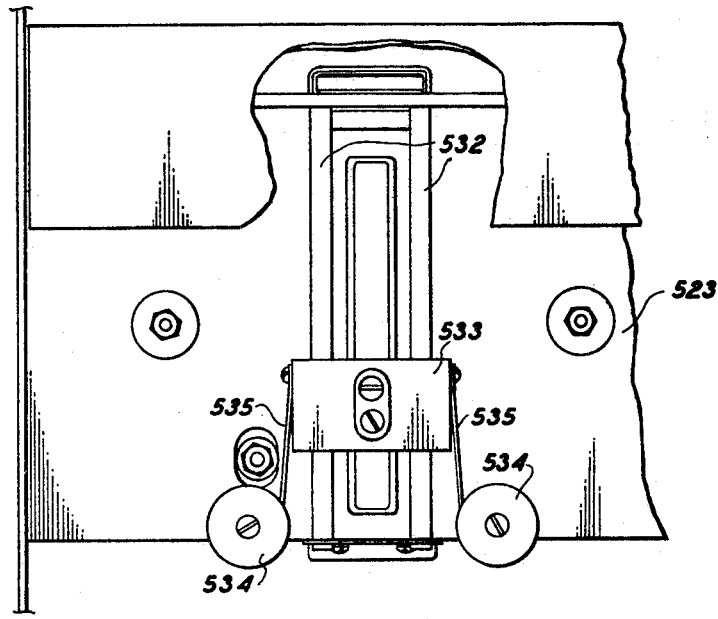
FIGURE 5 is a partial bottom view of the instant feeding device taken along the lines 5—5 of FIG. 4.

FIGURE 5 is a view of the underside of base plate 523. Tracks 532 are mounted on base plate 523 and carry block 533. The block supports and guides standard 530 which in turn supports adjustable plate 531. Two constant tension devices 534 are rigidly attached to the base plate at the end adjacent to fixed abutment plate 528. Devices 534 each have a band 535 attached to block 533. As the block is drawn away from the tension devices the force exerted by the bands on the block remains constant. The bands apply a constant bias on block 533 regardless of where the block is positioned along the tracks. Since the adjustable abutment plate is carried by block 533, cards 501 placed between plates 528 and 531 have a constant pressure applied to them regardless of the quantity of cards between the plates.

Figure 4:
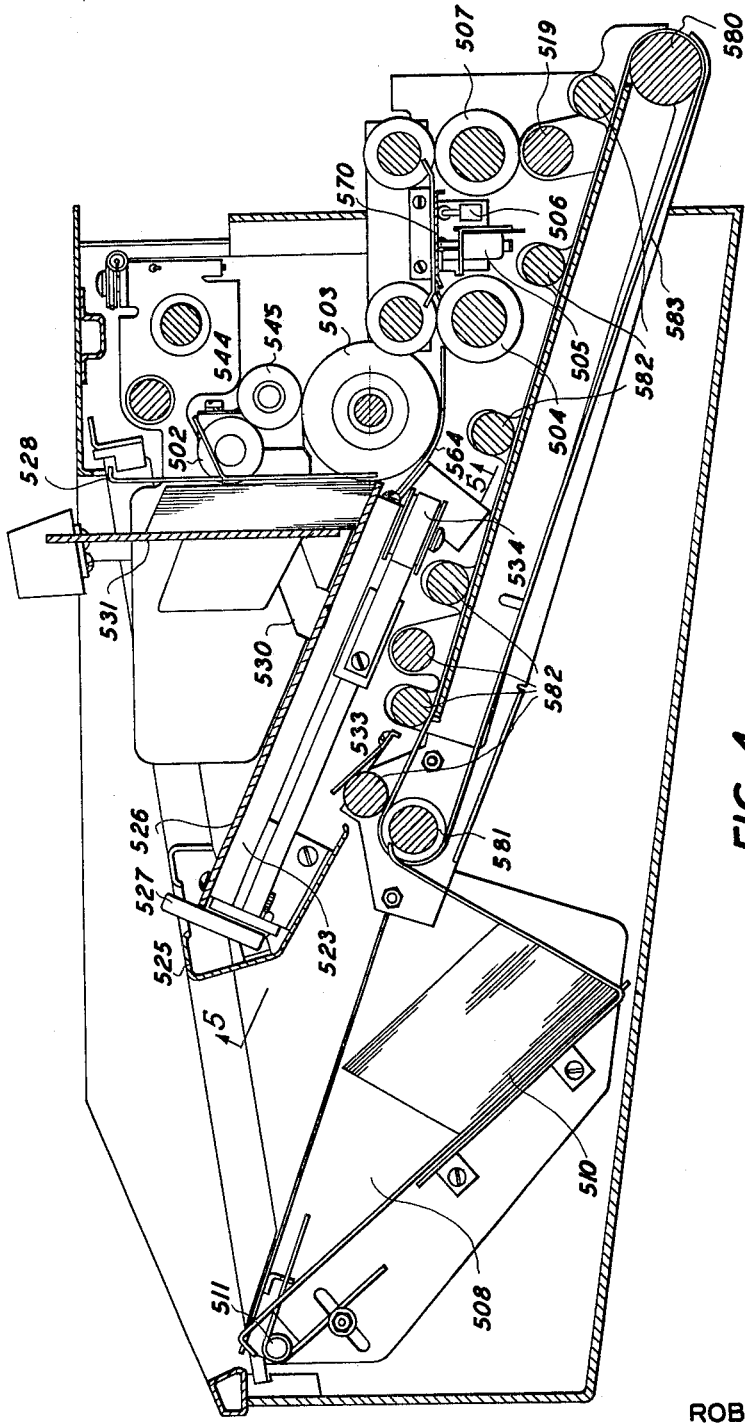
FIGURE 4 is an enlarged sectional view of the card feeder shown in FIGURE 2.

Referring now to FIGURE 4, friction wheel 503 is mounted on a shaft which is journaled to side plates 521 and 522. A portion of the peripheral surface of friction wheel 503 extends through fixed plate 528 near a leading edge of plate 526. The shortest distance between the circumference of the wheel and the leading edge of the bed plate defines a throat through which cards are passed during feeding.

Figure 7:
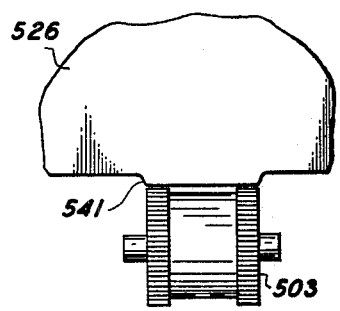
FIGURE 7 is a partial top view of the feeding device showing the relation of a bed plate to the feeding wheel.

Now referring to FIGURE 7, it is seen that plate 526 is essentially rectangular with boss 541 centrally located at one end of the plate to form the leading edge of the plate that defines one parameter of the throat through which cards are passed during feeding. The boss has a width substantially equivalent to the width of the friction wheel and is positioned directly opposite the friction wheel.

Friction wheel 503 has two tractor tread surfaces 538 on its circumference, best seen in FIGURE 6, and it is these surfaces which extend through fixed abutment plate 528. A conventional overriding clutch 542 is mounted inside friction wheel 503. The friction wheel normally rotates at the speed of its shaft, however, the overriding clutch permits the friction wheel to rotate at a faster speed than the shaft if an additional force is applied to the friction wheel. Electrically activated clutch 539 mounted on the same shaft as the friction wheel imparts rotation to the shaft when it is engaged. Electric clutch 539 receives power through gear 540.

Two nudger wheels 502 are mounted on truck 544 above the friction wheel and spaced apart to coincide with the spacing of the tractor treads 538 on friction wheel 503. The nudger wheels 502 are driven by intermediate wheels 545 also mounted on the truck. The intermediate wheels 545 are in contact with both the nudger wheels and the tractor treads to supply power to the nudger wheels whenever the friction wheel 503 is rotated. The circumference of the nudger wheels extend through the fixed abutment plate 528 substantially the same distance as the tractor treads.

Cards 501 inserted between the adjustable and fixed abutment plates are held under constant pressure against the friction wheel 503 and the nudger wheels 502 by the constant tension devices 534 as best seen in FIGURES 4 and 5. The nudger wheels force the leading card downward into the throat formed between the friction wheel and leading edge of bed plate 526. The cards are vertically displaced from one another by a slight distance, i.e., shingled, due to the incline of bed plate 526. Shingling of the cards aids the nudger wheels 543 to force the cards into the throat formed between the friction wheel and bed plate 526. The inclined bed plate also assists the friction wheel to eject a card through the throat formed by it with the bed plate.

The left and right margin guards 546 and 547, best seen in FIGURE 3, are slidably mounted on the carriage guide shaft 524 and the frame guide member 517, respectively. The left margin guard 546 is locked to the carriage guide shaft 524 and right-hand margin guard 547 is locked to the frame guide rod 517. The locks comprise a lever arm held in tension contact against a shaft or rod by a spring. The locks are released by depressing the lock handles 548 and 549. The left and right margin guards are laterally adjustable relative to the carriage guide shaft 524 and frame guide rod 517, respectively between side plates 521 and 522 and the extremities of adjustable abutment plate 531.

The cards 501, regardless of their size, must be centered about the friction wheel 503 to assure efficient operation of the ejection apparatus and proper registration of the cards relative to the xerographic machine. Pulleys 550 and 551 mounted on the carriage side panels and coupled by continuous cable 552 function jointly to maintain cards centered about friction wheel 503. The cable is secured to the right margin guard at point 553 and the left margin guard at point 554. When the right margin guard is moved along guide rod 517, the entire carriage, including the left margin guard, moves in the same direction through the same distance because of the mechanical link between the cable, pulleys and margin guards. Since the left margin guard is locked to the carriage guide shaft, the cable is not free to move about the pulleys when tension is applied to the cable that is, the cable 252 remains fixed against movement due to the locking of the left margin guard onto the carriage guide shaft 524 thereby defining the space between the two margin guards to accommodate various sized EAM cards. Since the spaced relationship between the margin guards is fixed by the locking of the left margin guard 546 onto carriage guide shaft 524, depressing of the lock handle 549 of right margin 547 unlocks the guard 547 from frame guide rod 517 to allow the entire carriage 513 to be moved relative to the frame 512 along frame guide rods 516, 517 and 518. This movement of the carriage 513 permits the feeding of the cards to the xerographic reproducing machine at varying lateral registrations relative to a predetermined position indicative of the position a toner powder image is supported on the photoreceptor for varying the placement of the toner powder image on the record card. Therefore, any movement of the right margin guard causes a like movement by the left margin guard 546 and carriage 513.

The operation is different when the left margin guard 546 is moved along guide shaft 524. Depressing the lock handle 548 permits the left margin guard to be moved along the carriage guide shaft 524. This time, however, the right margin guard remains fixed because it is locked to the frame guide rod 517 and the carriage 513 moves in the same direction as the left margin guard but only through half the distance. Since the right margin guard 547 is locked to the frame guide rod 517, the position of the right margin of a card in the feeder (defined by right margin guard 547) is maintained relative to a toner powder image on the photoreceptor regardless of the lateral position of the carriage 513 which is laterally movable on frame guide rods 516, 517, and 518. Therefore, various sized cards may be interchangeably used in the feeder with the image placed thereon in the same relative position due to the locking of the right margin guard 547 in a fixed position relative to the lateral movement of the carriage 513. While the right margin guard 547 is generally utilized to vary the placement of information onto an EAM card by varying the card's lateral registration relative to a fixed position which is indicative of a toner powder image supported on the xerographic reproducing machine's photoreceptor, the left margin guard is generally utilized to maintain various sized EAM cards centered about the friction wheel 503 while maintaining the placement of an image on the cards in the same relative position. Since the two pulleys 550 and 551 are supported on side plates 521 and 522 respectively and therefore maintained in a fixed spaced relationship, when right margin guard 547 is locked to frame guide rod 517 one end of the cable 552 secured to the guard at point 553 is fixed. Therefore when lock handle 548 of left margin guard 546 is depressed, the left margin guard is laterally movable along carriage guide shaft 524. Movement of the left margin guard moves the cable 552 which is secured thereto at point 554. As the left margin guard 546 is moved laterally due to the mechanical advantage of the pulley system and the securing of the one end of cable 552 to the guard 546 at point 553, the entire carriage 513 is moved in the same direction as the guard 546 but one half the distance. This mechanism permits various sized record cards to be utilized in the feeder, maintained in a position centered about friction feed wheel 503 and maintained in a position such that a toner powder image may be placed in the same relative position on the record card regardless of the size of the record card being utilized. For example, when the left margin guard is moved to the left a distance $2x$, the carriage moves a distance $x$ to the left because of the mechanical advantage supplied by pulley 551 and cable 552. The cable is free to move because the carriage 513 (carriage side plate 522) on which the pulley 551 is mounted is free to move relative to the frame. As the cable is pulled a distance $2x$ to the left the pulley 551 and carriage move a distance $x$ because of the force exerted on the pulley by the cable between the tie points 553 and 554.

Figure 8:
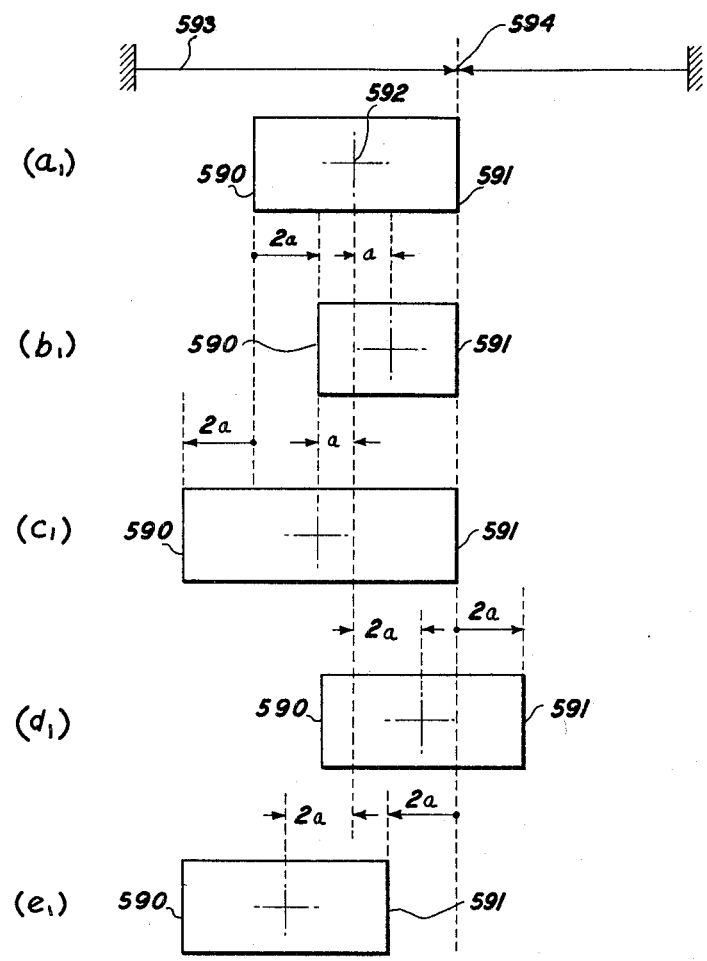
FIGURE 8 is a schematic of the card aligning mean.

FIGURES 8a through 8e illustrate the various positions to which the margin guards are moved and the relationship of the right and left margin guards to the carriage. FIGURE 8a shows an arbitrary beginning position for the various elements. Lines 590 and 591 represent the left and right hand margin guards respectively. The centerline symbol 592 represents the carriage and is used to show the relative movement of the carriage to the margin guards. The line 593 represents an external reference plane. Point 594 represents the point at which the right margin guard is maintained for the alignment of cards to an external reference plane that is, the position in which the right margin guard is maintained in order to place data upon a record card in the same relative position regardless of a change in card size. The adjustment of the margin guards give the feeding device the capability of aligning cards to an external reference plane while maintaining the cards centered about the friction wheel 503 or centerline 592.

FIGURE 8b illustrates the adjustment made when a smaller card is to be fed. The left margin 590 is moved to the right a distance $2a$, causing the carriage to move a distance $a$. The position of the right margin 591 is not disturbed, hence, the smaller card is properly aligned to the external reference point 594.

FIGURE 8c illustrates the movement of the left margin to the left to accommodate a larger card. The left margin guard has been moved a distance $2a$ to the left, and the carriage moved to the left a distance $a$ from the original position along line 292. Note that the feeding device can be adjusted to receive cards of different size without disturbing the alignment of the right margin of the card to an external reference point.

FIGURE 8d and 8e illustrate the positions of the margins and carriage when the right margin 511 is repositioned to a new reference point to the right and left of the initial reference point 594. As shown, the card is maintained centered about the friction wheel 503 (center line 592) regardless of repositioning of the card (as determined by guard 591) relative to the reference plane 594. The right margin is adjusted to accommodate a larger image to be placed on the cards and/or to permit an image to be reproduced at different areas on a card.

Referring now to FIGURE 6, the shafts of the primary feed rollers 504 and secondary feed rollers 507 are mounted on bearings in the carriage side panels 521 and 522. The upper rollers are idler rollers. Feed roller 507 is coupled by gear 560 to spline shaft 519 and runs continuously when power is supplied to the spline shaft 519. The primary roller 504 has electrically actuated clutch 561 (partially hidden) mounted on its shaft at the end mounted in side panel 521. Electrically actuated brake 562 is mounted on the shaft of the primary roller at the end mounted in side panel 522. Power is supplied to primary roller 504 by a belt coupled between the secondary roller and the primary roller. The gear 540 on the friction wheel shaft is driven by gear 563 on the primary roller shaft.

A platen 570, shown in FIGURE 4, is supported between the primary and secondary feed rollers. Supported beneath the platen are stop switch 505 and inhibit switch 506. These switches have arms extending through the platen which are depressed when they are in contact with a card causing the generation of an electrical signal. A signal produced by stop switch 505 is applied to clutch 561 and brake 562 coupled to the primary roller 504 to stop the advancement of a card the instant the stop switch detects the presence of a card. The signal produced by the inhibit switch 505 is transmitted to xerographic machine to prevent the formation of a subsequent image on the photoreceptive belt 10. This signal is not removed until a card completely passes the inhibit switch.

Power is supplied to the feeding device by a power source internal to the xerographic machine. Sprocket 520 and spline shaft 519 are driven by the machine power source by a belt coupled to the sprocket. The spline shaft in turn continuously drives secondary roller 507 through gear 560. Gear 560 is mated to spline shaft regardless of the position to which the carriage 500 is moved on the frame guide rods.

Power is supplied to the primary roller by a belt coupled between the primary and secondary rollers.

Power is applied to friction wheel 503 through gears 563 and 540 coupled to the primary feed rollers and the friction wheel respectively. The friction wheel drives the nudger wheels 502 through intermediate wheels 545.

The operation of the feeding device proceeds as follows. A card of particular size is placed onto carriage 513 between margin guards 546 and 547 which are adjusted to the width of the card. Adjustable abutment plate 531 is allowed to come into pressure contact with the stack forcing the cards against fixed abutment plate 528 and the nudger wheels and friction wheel extending therethrough. A scale and marker are provided to align the right margin guide to the image formed on the photoreceptive belt 10. Movement of the left or right margin guards produces a compensating movement of the carriage to maintain the cards centered about the friction wheel.

The dimension of the card feeding throat formed between bed plate 526 and the friction wheel is adjusted to slightly less than the thickness of the cards. This adjustment is made by turning dial 527.

The constant pressure applied by adjustable abutment plate 531 on the cards increases the friction between adjacent cards within the stack but it also increases the friction between the card abutting the friction wheel and nudger wheels. The friction between the card butting the nudger wheels and friction wheels is much greater than the friction between the abutting card and others in the stack thereby enhancing the separation of the card from the stack through the throat. The ejection of a card is aided by the inclined bed plate 526 because of the shingled relationship given the cards by the bed plate. The width of the throat is slightly less than the thickness of a card to prevent more than one card from being fed at a time. The surfaces on the friction wheel permit the throat to be narrower than the thickness of a card.

When power is initially applied to the feeding device, feed roller clutch 561 and friction wheel clutch 539 are engaged and the brake 562 is released thereby enabling the friction wheel and nudger wheels to eject the first card from the stack. The card is advanced by friction wheel 503 along guide member 564 to the primary feed rollers. The primary feed rollers rotate at a greater angular velocity than the friction wheel and as a result pull the card from the friction wheel. The overriding clutch 542 enables the friction wheel to be rotated at a greater rate than its shaft thereby permitting the faster rotating feed rollers to pull a card from the friction wheel. This pulling operation establishes a spacing between the cards ejected from the stack. Rotating the feed rollers about twenty percent faster than the friction wheel has been found to establish a satisfactory spacing between the cards. The primary feed rollers advance a card into contact with stop switch 505 which generates an electrical signal used to release clutch 561 and to activate brake 562 thereby stopping the primary feed rollers and the friction wheel.

The card positioned at the stop switch is ready to be fed to the xerographic machine. The formation of an image on photoreceptive belt 10 initiates the generation of an electrical signal which releases the feed roller brake and engages the clutch thereby causing the primary feed rollers to advance the card across the platen 570 to secondary feed rollers 507. As the card advances across the platen inhibit switch 506 is activated. The inhibit switch causes an electrical signal to be transmitted to the xerographic machine to prevent the formation of a second image on the photoreceptive belt.

The constantly driven secondary feed rollers propel the card onto conveyor 710 which carries the card to the transfer station 4, where a developed toner particle image is transferred to the card. Thereafter the card is carried by conveyor 720 to fusing station 800 where the developed image is permanently affixed to the card. Conveyors 720 and 730 deliver the card to conveyor 509 which in turn delivers it to the stacker tray 508.

Conveyor 509 comprises rollers 580 and 581 journaled in side plates 521 and 522. Coupled between rollers 580 and 581 are a plurality of card transport belts 583 on which the cards are supported. The cards are held in contact with belts 583 to facilitate their transport by a plurality of idler rollers 582 journaled in side plates 521 and 522 at spaced intervals along the conveyor. Power is continuously applied to the conveyor by an appropriate drive means coupled between roller 581 and the continuously driven secondary feed roller 507. The stacker tray 508 is also supported by side plates 521 and 522.

When the primary feed rollers were activated to advance the card from its position at stop switch 505, the friction wheels and nudger wheels were also activated. The second card in the stack was under the influence of the friction wheel at that time and traveled only a short distance before arriving at the primary feed rollers. The primary feed rollers also pulled this card away from the friction wheel because of its faster rotational speed. The second card advanced until it triggered the stop switch causing the generation of the signal that stops the feed rollers. When the first card requested by the xerographic machine had completely passed the inhibit switch signal was removed from the xerographic machine and a second image was free to be formed. Therefore, when the second image was formed on the photoreceptive belt a signal was again generated by the machine to energize the primary feed rollers thereby driving the second card forward. As this card is advanced a third card is brought into position at stop switch 505. The cycle followed by the first card is therefore repeated until the required number of cards are delivered to the xerographic machine.

The feeding of cards continues in this manner until the xerographic machine transmits an electrical signal to the feeding device indicating that only one more card is needed. This signal causes the friction wheel clutch 539 to be disengaged. Therefore, the card positioned at the stop switch at this time is advanced to the xerographic machine by the primary feed rollers but the next card in the stack is not advanced to a position at the stop switch. This latter card will be the first card fed to the xerographic machine when the feeding device is subsequently requested to deliver a card.

While the invention has been described with reference to the structures disclosed herein, it is not confined to the details set forth, and this application is intended to cover such modifications or changes as may come within the purposes or the scope of the following claims.

What is claimed is:

1. Card aligning means, for use with a feeding device of the type wherein cards are fed serially from a stack, to center the cards about a feeder mechanism and to maintain the centered relationship when a margin of the cards is aligned to a reference point comprising:
   a frame including a guide member supported thereby,
   a carriage supported by said frame and laterally adjustable relative thereto along the guide member,
   a guide shaft rigidly mounted on the carriage parallel to said frame guide member,
   right and left margin guards slidably supported for lateral movement relative to the carriage and frame in a path parallel to the carriage guide shaft,
   a pulley mechanism operatively connected to said carriage including at least two pulleys coupled by an endless cable secured to the right and left margin guards,
   right margin guard lock means for stationarily securing the right margin guard to the frame guide member such that lateral positioning of the left margin guard actuates said pulley mechanism to said carriage half the distance in the same direction, and
   left margin guard lock means for securing the left margin guard to the carriage guide shaft such that lateral positioning of the right margin guard move said carriage an equidistance in the same direction.

2. A feeding apparatus for the serial feeding of card stock comprising:
   a fixed abutment plate supported in a substantially vertical position,
   a friction feed wheel rotatably supported adjacent said fixed abutment plate with a portion of the peripheral surface extending therethrough,
   a nudger wheel rotatably supported above said friction wheel with a portion of the peripheral surface of the nudger wheel extending therethrough a distance substantially equal to the distance said friction wheel extends therethrough, an inclined bed plate supported adjacent to the friction wheel forming a throat between a leading edge and the peripheral surface of said friction wheel for serially passing cards therethrough, said inclined bed plate imparting a shingled relationship to cards supported thereon, an adjustable abutment plate supported above said bed plate in a position substantially parallel to the fixed abutment plate to maintain a quantity of cards therebetween, constant force means coupled to said adjustable abutment plate for biasing said plate toward said fixed plate such that cards are constrained under constant pressure against the nudger wheel and friction wheel independent of the quantity of cards between said plates, feed rollers rotatable at a greater angular velocity than said friction wheel and supported adjacent thereto to advance cards passed through said throat, an override clutch coupled to said friction wheel to enable said feed rollers to advance the cards at spaced intervals, electrically actuated drive means coupled to said friction wheel and said feed rollers for rotating and stopping said wheel and rollers in response to electrical signals, gating means, positioned adjacent said feed rollers in the path of a card advanced by said rollers, electrically coupled to said drive means for generating a signal to control the rotation of said wheel and rollers upon detecting the presence of a card at said gating means.

3. A feeding apparatus according to claim 2 including a card aligning mechanism comprising:

a frame including a guide member supported thereby, a carriage supported by said frame and laterally adjustable relative thereto along the guide member, a guide shaft rigidly mounted on the carriage parallel to said frame guide member, right and left margin guards slidably supported for lateral movement relative to the carriage and frame in a path parallel to the carriage guide shaft, a pulley mechanism operatively connected to said carriage including at least two pulleys coupled by an endless cable secured to the right and left margin guards, right margin guard lock means for stationarily securing the right margin guard to the frame guide member such that lateral positioning of the left margin guard actuates said pulley mechanism to said carriage half the distance in the same direction, and left margin guard lock means for securing the left margin guard to the carriage guide shaft such that lateral positioning of the right margin guard move said carriage an equidistance in the same direction.

4. A feeding apparatus for the serial feeding of card stock comprising:

a fixed abutment plate supported in a substantially vertical position, a friction feed wheel rotatably supported adjacent said fixed abutment plate with a portion of the peripheral surface extending therethrough, a nudger wheel rotatably supported above said friction wheel with a portion of the peripheral surface of the nudger wheel extending therethrough a distance substantially equal to the distance said friction wheel extends therethrough, an inclined bed plate supported adjacent to the friction wheel forming a throat between a leading edge and the peripheral surface of said friction wheel for serially passing cards therethrough, said inclined bed plate imparting a shingled relationship to cards supported thereon, an adjustable abutment plate supported above said bed plate in a position substantially parallel to the fixed abutment plate to maintain a quantity of cards therebetween, constant force means coupled to said adjustable abutment plate for biasing said plate toward said fixed plate such that cards are constrained under constant pressure against the nudger wheel and friction wheel independent of the quantity of cards between said plates, feed rollers rotatable at a greater angular velocity than said friction wheel and supported adjacent thereto to advance cards passed through said throat, an override clutch coupled to said friction wheel to enable said feed rollers to advance the cards at spaced intervals, electrically actuated drive means coupled to said friction wheel and said feed rollers for rotating and stopping said wheel and rollers in response to electrical signals, gating means, positioned adjacent said feed rollers in the path of a card advanced by said rollers, electrically coupled to said drive means for generating a first signal to stop the rotation of said friction wheel and feed rollers upon detecting the presence of a card at said gate, and a signal source electrically coupled to said drive means for generating a second signal applied thereto actuating said drive means for advancing the cards at spaced intervals.

5. Apparatus adapted for feeding card stock in serial fashion from a stacked relationship to a xerographic machine comprising:

a pair of roller members engaged in rolling contact to form a bite to frictionally engage and advance cards to said machine, feed wheel means engageable with the foremost card in a stack for advancing cards to said roller members, a support plate having one edge thereof adjacent said feed wheel means to define a throat through which cards are serially advanced, said support plate being inclined at an acute angle from a plane tangentially disposed to said feed wheel means through said throat, nudger wheel means supported adjacent said feed wheel means and engageable with the foremost card in a stack at a point along said tangentially disposed plane extending through said throat for advancing cards into said throat, an abutment plate extending above said support plate in a plane substantially parallel to the plane through said throat tangential to the surface of said nudger and said feed wheel means, means normally biasing said abutment plate toward said nudger and said feed wheel means to support a stack of card stock edgewise of said support plate in a shingled relationship with the foremost card of the stack engaging said nudger and said feed wheel means, means operatively connecting said feed wheel and said nudger wheel means for rotating said nudger wheel means when said feed wheel means is rotated, drive means operable in response to electrical signals for rotating said roller members at a first predetermined peripheral velocity and for rotating said feed wheel means at a second predetermined peripheral velocity less than the peripheral velocity at which said roller members are driven, said drive means including means associated with said feed wheel means for permitting said feed wheel means to be overdriven at the higher peripheral velocity of said roller members as a card is withdrawn from engagement with said feed wheel means by said roller members, and sensing means responsive to cards being advanced by said roller members to generate electrical signals for controllably actuating said drive means.

6. Apparatus according to claim 5 further including, means for adjustably positioning said support plate along the plane of inclination thereof to regulate the width of said throat.

References Cited

UNITED STATES PATENTS

| 2,869,869 | 1/1959 | Bauer | 271—36 |
| 2,813,717 | 11/1957 | Mentzer | 271—37 |
| 3,173,684 | 4/1965 | Binzoni | 271—57 |

FOREIGN PATENTS 1,238,045  4/1967  Germany.

RICHARD E. AEGERTER, Primary Examiner